Figure 1:
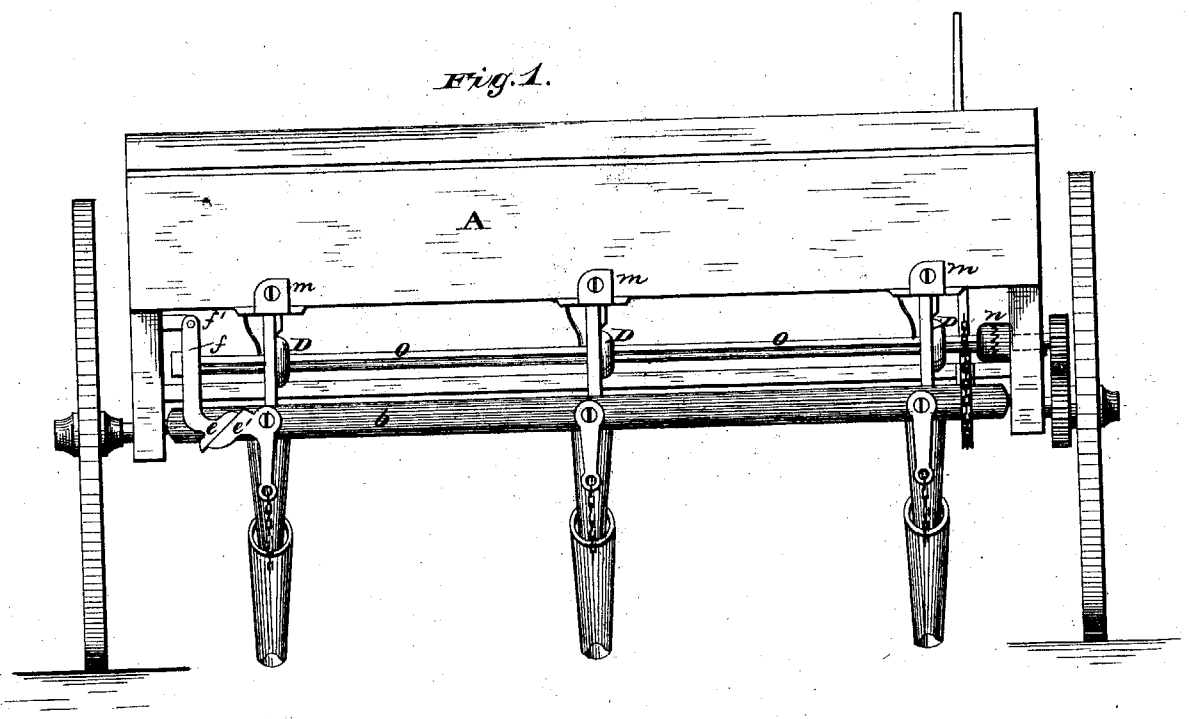

2 Sheets—Sheet 1.

A. PUTNAM.

Assignor, by mesne assignments, to T. D. GERE.

Seeding-Machine.

No. 8,122. Reissued March 12, 1878.

WITNESSES

Franck L. Durand

Alex Mahon

INVENTOR

Archibald Putnam
assignor to Thos. D. Gere.
by A. C. Smith
ATTORNEY

N. PETERS, PHOTO-LITHOGRAPHER, WASHINGTON, D. C.

2 Sheets—Sheet 2.
A. PUTNAM.
Assignor, by mesne assignments, to T. D. GERE.
Seeding-Machine.
No. 8,122. Reissued March 12, 1878.
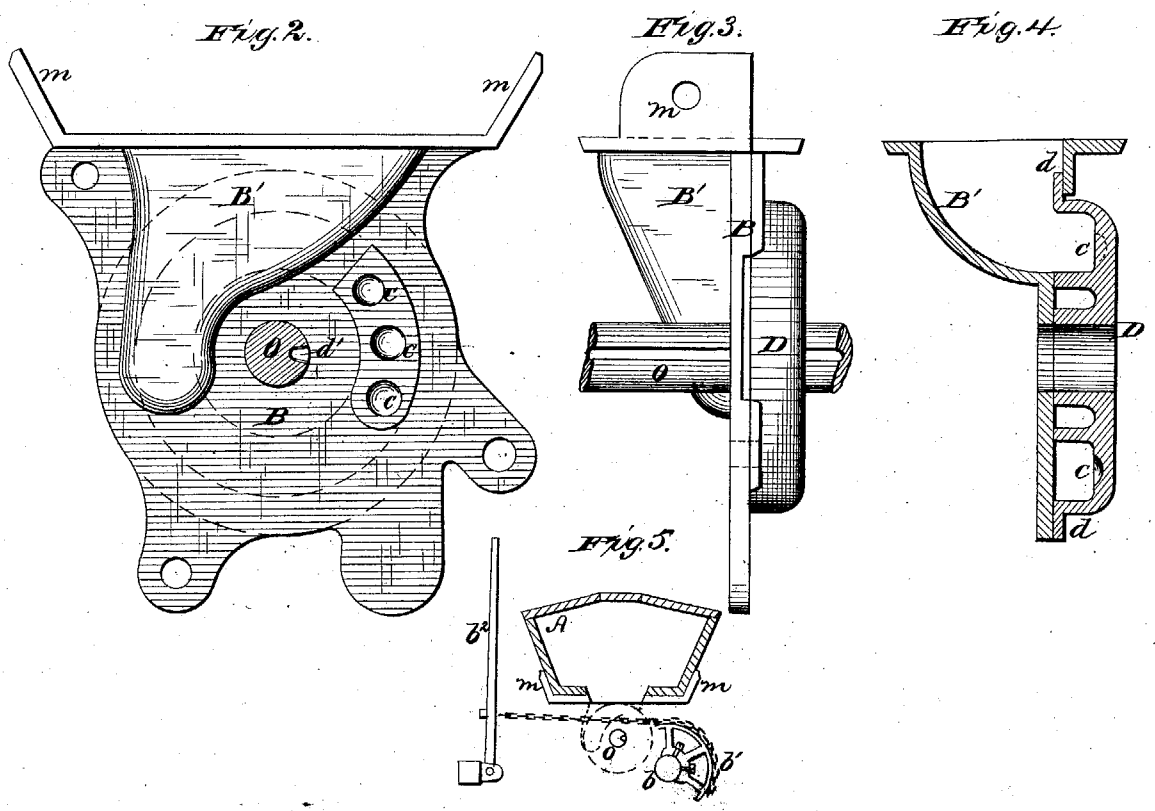
WITNESSES
Franck L. Durand
Alex Mahon
INVENTOR
Archibald Putnam
assignor to Theo. D. Gere
by A. M. Smith
ATTORNEY
N. PETERS, PHOTO-LITHOGRAPHER, WASHINGTON, D. C.

UNITED STATES PATENT OFFICE.

THEODORE D. GERE, OF OWEGO, NEW YORK, ASSIGNEE, BY MESNE ASSIGNMENTS, OF ARCHIBALD PUTNAM.

IMPROVEMENT IN SEEDING-MACHINES.

Specification forming part of Letters Patent No. 89,072, dated April 20, 1869; Reissue No. 8,122, dated March 12, 1878; application filed February 16, 1878.

*To all whom it may concern:*

Be it known that ARCHIBALD PUTNAM, of Owego, in the county of Tioga, State of New York, did invent certain new and useful Improvements in Grain-Drills, of which the following is a full and exact description, reference being had to the accompanying drawings, in which—

Figure 1 represents a rear elevation of the machine. Fig. 2 is a side elevation, on a larger scale, of one of the distributers, showing the side plate with its distributing-wheel, with the grooved shaft in section. Fig. 3 is a rear elevation of the wheel and its side or casing plates. Fig. 4 represents a vertical section through the same; and Fig. 5 is a vertical section through the seed-box and lifting-roller, showing the mode of raising the drill-teeth from the ground.

Similar letters of reference denote corresponding parts wherever used.

The invention consists, first, in mounting the distributing-wheels upon a round shaft, which has its bearings in the casing or side plate of said wheel, and connecting it with said shaft, for causing its rotation therewith by means of a spur or tooth formed in the eye or perforation of the wheel entering a longitudinal groove in the shaft, as hereinafter explained.

It further consists in a novel construction of the distributing-wheel, and in a novel means employed for throwing the distributers into and out of action in the operation of raising and lowering the hoes or teeth, as hereinafter described.

In the accompanying drawings, A represents the grain-box, mounted on wheels in any usual or preferred manner. Underneath this box is the seeding arrangement, as follows: B B represent a series of face or casing plates, attached to the box A through lugs or ears *m*, and provided each with a seed-cup or secondary hopper, open at its upper end for receiving grain from the box A. The lugs *m* are so applied to or formed upon the face-plates B as to adapt them to be connected with the sides or front and rear of the grain-box, as shown, instead of underneath said box, in the usual manner, thereby making the attachment stronger, and at the same time more accessible, facilitating the removal and replacement of the face-plates. At the side of the face-plate, and covering the open side of the hopper B′, is the distributing-wheel D, moving in close proximity with and held up to the face-plate by means of a vertical flange, *d*, on its periphery, and retaining lugs or ears attached to the face-plate and overhanging said flange.

The side of the wheel adjoining the face-plate B has a circular groove or channel formed in it, which receives the grain from the hopper or cup B′, and conveys it, as the wheel is rotated, to the discharge outlet or opening in the face-plate. The wall of this channel has a series of indentations or pockets, *c c*, formed in it, which serve to give a positive movement to the grain, and which are much less liable to break or crush the grain than the ribs or "starts" ordinarily employed for that purpose.

The wheel has a tooth or spur, *d′*, formed upon it, projecting within the eye or central perforation, through which the driving-shaft O passes, said pin entering a longitudinal groove in the shaft O, and causing the wheel to rotate with the shaft. By this construction the shaft O, which is round, is adapted to have its bearings directly in the face or casing plates B, without the interposition of hubs or sleeves on the wheels, or other intermediate device, such as is required where a different form of shaft is employed; and the wheel itself, instead of having a hub or sleeve journaled in said casing-plate, is both supported and rotated by the shaft, thus giving greater economy in construction than in the ordinary construction and arrangement of said parts.

The groove or grooves extend the entire length of the shaft, adapting the wheels to be readily slipped on from one end, and facilitating the removal of the feed-wheels when worn or broken, and their replacement by others. The teeth or spurs *d′* are cast with the wheel, and are small and slight, adapting them to be comparatively easily broken; and if an obstruction should enter the wheel and prevent its rotation, the spur would snap off, leaving the shaft free to rotate, thereby obviating the danger of breaking some part of the machine more expensive to replace than the small cast-iron distributing-wheel.

The rod O is divided at the clutch *n*, from which the portion actuating the distributing-wheels receives its motion, the latter portion being adapted to move endwise for throwing into and out of gear. At or near the opposite end to the clutch the shaft has a lever, *f*, connected with it, one end of which is pivoted at *f'*. The opposite end of this lever is provided with an inclined piece or cam, *e*, which rests in contact with and is actuated by a corresponding inclined way or cam, *e'*, on the lifting-roller *d*, the rocking movement of the roller, in raising or lowering the hoes, acting through said inclines and lever to give an endwise movement to shaft O, for throwing it out of action when the hoes are lifted out of the ground, and into action when the hoes are again lowered into working position.

The lifting-roller *b* is provided with a sheave or pulley, or segment of either, $b^1$, carrying a chain, which extends to a lever, $b^2$, forward of the grain-box, as shown, and by means of which the teeth can be raised or lowered by the attendant while sitting on the grain-box, and without his being obliged to raise them by a lever in rear of the grain-box, as is ordinarily done.

It will be apparent that if a polygonal or feathered shaft were employed for rotating the distributing-wheels, such shaft could not be journaled directly in the casing or face plate, and would require the interposition of a hub of the wheel or other sleeve, cylindrical on its outer face for that purpose, while if a round shaft were employed, without the longitudinal groove, the wheels would necessarily have to be keyed or otherwise fastened to the shaft in such manner as would interfere with their ready removal, and with any end movement of the shaft, while by the employment of a round shaft having the longitudinal groove or grooves, it is adapted to have its bearings directly in the casing-plates. The necessity for bearing-hubs, or other intermediate bearing-sleeves, is obviated, and the wheels being supported and rotated by said shaft, all danger of cramping is obviated, while the wheels are adapted to be readily removed and replaced when injured or broken; and, further, a round grooved rod, even if the bearings are made in the hubs of the cast wheels, has the advantage of having a greater torsional strength in proportion to its weight than any square or polygonal form, and also is more easily finished true and straight.

Having thus described the invention of the said ARCHIBALD PUTNAM, what is claimed, and sought to be secured by Letters Patent, is—

1. The round longitudinally-grooved distributing-wheel shaft, in combination with the distributing-wheels of a grain-drill, provided with spurs or teeth engaging with said grooved shaft, substantially as and for the purpose set forth.

2. The grooved distributer-wheel shaft, having its bearings directly in the face or casing plates, in combination with the distributing-wheels, supported upon and driven by said shaft, substantially as described.

3. The channeled or laterally-flanged distributing-wheel D, provided with the vertical rib or flange *d* on its periphery, substantially as and for the purpose set forth.

4. The grooved sliding rod or shaft O, divided at the clutch *n*, in combination with the lever *f* and inclines *e e'* on the lever and lifting-roller, for throwing the distributing-wheels out of and into action simultaneously with the raising and lowering of the hoes or teeth, as described.

THEODORE D. GERE.

Witnesses:
GEO. STRATTON,
B. C. STILES.